(12) United States Patent
Lightner et al.

(10) Patent No.: US 9,355,152 B2
(45) Date of Patent: May 31, 2016

(54) NON-EXCLUSIONARY SEARCH WITHIN IN-MEMORY DATABASES

(71) Applicant: QBASE, LLC, Reston, VA (US)

(72) Inventors: Scott Lightner, Leesburg, VA (US); Franz Weckesser, Spring Valley, OH (US)

(73) Assignee: QBase, LLC, Reston, VA (US)

(*) Notice: Subject to any disclaimer, the term of this patent is extended or adjusted under 35 U.S.C. 154(b) by 0 days.

(21) Appl. No.: 14/558,101

(22) Filed: Dec. 2, 2014

(65) Prior Publication Data

US 2015/0154194 A1 Jun. 4, 2015

Related U.S. Application Data

(60) Provisional application No. 61/910,867, filed on Dec. 2, 2013.

(51) Int. Cl.
*G06F 17/30* (2006.01)

(52) U.S. Cl.
CPC ...... *G06F 17/3053* (2013.01); *G06F 17/30542* (2013.01)

(58) Field of Classification Search
CPC .............. G06F 17/3053; G06F 17/30542
USPC ........................................ 707/770
See application file for complete search history.

(56) References Cited

U.S. PATENT DOCUMENTS

| 6,128,660 | A | 10/2000 | Grimm et al. |
|---|---|---|---|
| 6,178,529 | B1 | 1/2001 | Short et al. |
| 6,266,781 | B1 | 7/2001 | Chung et al. |
| 6,353,926 | B1 | 3/2002 | Parthesarathy et al. |
| 6,738,759 | B1 * | 5/2004 | Wheeler et al. ............... 707/741 |
| 6,832,373 | B2 | 12/2004 | O'Neill |
| 7,058,846 | B1 | 6/2006 | Kelkar et al. |
| 7,099,898 | B1 | 8/2006 | Nakamura et al. |
| 7,370,323 | B2 | 5/2008 | Marinelli et al. |
| 7,421,478 | B1 | 9/2008 | Muchow |
| 7,447,940 | B2 | 11/2008 | Peddada |
| 7,543,174 | B1 | 6/2009 | van Rietschote et al. |
| 7,681,075 | B2 | 3/2010 | Havemose et al. |
| 7,818,615 | B2 | 10/2010 | Krajewski et al. |

(Continued)

FOREIGN PATENT DOCUMENTS

WO 2013/003770 A2 1/2013

OTHER PUBLICATIONS

International Search Report and Written Opinion of the International Searching Authority dated Apr. 15, 2015 corresponding to International Patent Application No. PCT/US2014/068002, 10 pages.

(Continued)

*Primary Examiner* — Jorge A Casanova
(74) *Attorney, Agent, or Firm* — Eric L. Sophir; Dentons US LLP

(57) ABSTRACT

Methods for non-exclusionary searching within clustered in-memory databases are disclosed. The non-exclusionary search methods may allow the execution of searches where the results may include records where fields specified in the query are not populated or defined. The disclosed methods include the application of fuzzy matching and scoring algorithms, which enables the system to search, score and compare records with different schemata. This may significantly improve the recall of relevant records.

7 Claims, 2 Drawing Sheets

(56) References Cited

U.S. PATENT DOCUMENTS

| | | |
|---|---|---|
| 7,899,871 B1 | 3/2011 | Kumar et al. |
| 8,055,933 B2 | 11/2011 | Jaehde et al. |
| 8,122,026 B1 | 2/2012 | Laroco et al. |
| 8,341,622 B1 | 12/2012 | Eatough |
| 8,345,998 B2 | 1/2013 | Malik et al. |
| 8,356,036 B2 | 1/2013 | Betchel et al. |
| 8,375,073 B1 | 2/2013 | Jain |
| 8,423,522 B2 | 4/2013 | Lang et al. |
| 8,429,256 B2 | 4/2013 | Vidal et al. |
| 8,726,267 B2 | 5/2014 | Li et al. |
| 8,782,018 B2 | 7/2014 | Shim et al. |
| 8,995,717 B2 | 3/2015 | Cheng et al. |
| 9,009,153 B2 | 4/2015 | Kahn et al. |
| 9,025,892 B1 | 5/2015 | Lightner et al. |
| 9,032,387 B1 | 5/2015 | Hill et al. |
| 2001/0037398 A1 | 11/2001 | Chao et al. |
| 2002/0031260 A1 | 3/2002 | Thawonmas et al. |
| 2002/0165847 A1 | 11/2002 | McCartney et al. |
| 2002/0174138 A1* | 11/2002 | Nakamura ........ G06F 17/30595 |
| 2003/0028869 A1 | 2/2003 | Drake et al. |
| 2003/0112792 A1 | 6/2003 | Cranor et al. |
| 2003/0158839 A1 | 8/2003 | Faybishenko et al. |
| 2003/0182282 A1* | 9/2003 | Ripley .............................. 707/5 |
| 2004/0010502 A1* | 1/2004 | Bomfim ............ G06F 17/30371 |
| 2004/0027349 A1 | 2/2004 | Landau et al. |
| 2004/0049478 A1 | 3/2004 | Jasper |
| 2004/0143571 A1 | 7/2004 | Bjornson et al. |
| 2004/0153869 A1 | 8/2004 | Marinelli et al. |
| 2004/0205064 A1* | 10/2004 | Zhou et al. ......................... 707/5 |
| 2004/0215755 A1 | 10/2004 | O'Neill |
| 2004/0243645 A1 | 12/2004 | Broder et al. |
| 2005/0091211 A1 | 4/2005 | Vernau et al. |
| 2005/0192994 A1 | 9/2005 | Caldwell et al. |
| 2006/0101081 A1 | 5/2006 | Lin et al. |
| 2006/0294071 A1 | 12/2006 | Weare et al. |
| 2007/0005639 A1 | 1/2007 | Gaussier et al. |
| 2007/0100806 A1 | 5/2007 | Ramer et al. |
| 2007/0156748 A1 | 7/2007 | Emam et al. |
| 2007/0174289 A1 | 7/2007 | Utiger |
| 2007/0203693 A1 | 8/2007 | Estes |
| 2007/0203924 A1 | 8/2007 | Guha et al. |
| 2007/0240152 A1 | 10/2007 | Li et al. |
| 2007/0250519 A1 | 10/2007 | Fineberg et al. |
| 2007/0282959 A1 | 12/2007 | Stern |
| 2008/0010683 A1 | 1/2008 | Baddour et al. |
| 2008/0027920 A1 | 1/2008 | Schipunov et al. |
| 2008/0077570 A1 | 3/2008 | Tang et al. |
| 2009/0019013 A1 | 1/2009 | Tareen et al. |
| 2009/0043792 A1 | 2/2009 | Barsness et al. |
| 2009/0049038 A1 | 2/2009 | Gross |
| 2009/0089626 A1 | 4/2009 | Gotch et al. |
| 2009/0094484 A1 | 4/2009 | Son et al. |
| 2009/0222395 A1 | 9/2009 | Light et al. |
| 2009/0240682 A1 | 9/2009 | Balmin et al. |
| 2009/0292660 A1 | 11/2009 | Behal et al. |
| 2009/0299999 A1 | 12/2009 | Loui et al. |
| 2009/0322756 A1 | 12/2009 | Robertson et al. |
| 2010/0077001 A1 | 3/2010 | Vogel et al. |
| 2010/0138931 A1 | 6/2010 | Thorley et al. |
| 2010/0223264 A1 | 9/2010 | Bruckner et al. |
| 2010/0235311 A1 | 9/2010 | Cao et al. |
| 2010/0274785 A1 | 10/2010 | Procopiuc et al. |
| 2011/0071975 A1 | 3/2011 | Friedlander et al. |
| 2011/0093471 A1* | 4/2011 | Brockway et al. ............ 707/747 |
| 2011/0099163 A1 | 4/2011 | Harris et al. |
| 2011/0119243 A1 | 5/2011 | Diamond et al. |
| 2011/0125764 A1 | 5/2011 | Carmel et al. |
| 2011/0161333 A1 | 6/2011 | Langseth et al. |
| 2011/0282888 A1 | 11/2011 | Koperski et al. |
| 2011/0296390 A1 | 12/2011 | Vidal et al. |
| 2011/0296397 A1 | 12/2011 | Vidal et al. |
| 2012/0030220 A1 | 2/2012 | Edwards et al. |
| 2012/0059839 A1 | 3/2012 | Andrade et al. |
| 2012/0102121 A1 | 4/2012 | Wu et al. |
| 2012/0117069 A1 | 5/2012 | Kawanishi et al. |
| 2012/0131139 A1 | 5/2012 | Siripurapu et al. |
| 2012/0246154 A1* | 9/2012 | Duan et al. .................... 707/728 |
| 2012/0310934 A1 | 12/2012 | Peh et al. |
| 2012/0323839 A1 | 12/2012 | Kiciman et al. |
| 2013/0132405 A1 | 5/2013 | Bestgen et al. |
| 2013/0166480 A1 | 6/2013 | Popescu et al. |
| 2013/0166547 A1 | 6/2013 | Pasumarthi et al. |
| 2013/0290232 A1 | 10/2013 | Tsytsarau et al. |
| 2013/0303198 A1 | 11/2013 | Sadasivam et al. |
| 2014/0013233 A1 | 1/2014 | Ahlberg et al. |
| 2014/0022100 A1 | 1/2014 | Fallon et al. |
| 2014/0156634 A1 | 6/2014 | Buchmann et al. |
| 2014/0244550 A1 | 8/2014 | Jin et al. |
| 2014/0280183 A1 | 9/2014 | Brown et al. |
| 2014/0351233 A1 | 11/2014 | Crupi et al. |
| 2015/0074037 A1 | 3/2015 | Sarferaz |
| 2015/0154079 A1 | 6/2015 | Lightner et al. |
| 2015/0154264 A1 | 6/2015 | Lightner et al. |
| 2015/0154297 A1 | 6/2015 | Lightner et al. |

OTHER PUBLICATIONS

International Search Report and Written Opinion dated Mar. 6, 2015 corresponding to International Patent Application No. PCT/US2014/067993, 9 pages.

International Search Report and Written Opinion dated Mar. 10, 2015 corresponding to International Patent Application No. PCT/US2014/067999, 10 pages.

International Search Report and Written Opinion dated Feb. 24, 2015 corresponding to International Patent Application No. PCT/US2014/067918, 10 pages.

International Search Report and Written Opinion of the International Searching Authority dated Mar. 3, 2015 corresponding to International Patent Application No. PCT/US2014/067921, 10 pages.

International Search Report dated Apr. 15, 2015 corresponding to International Patent Application No. PCT/US2014/067994, 4 pages.

Written Opinion of the International Searching Authority dated Apr. 15, 2015 corresponding to International Patent Application No. PCT/US2014/067994, 9 pages.

Tunkelang, D., "Faceted Search," Morgan & Claypool Publ., 2009, pp. i-79.

Schuth, A., et al., "University of Amsterdam Data Centric Ad Hoc and Faceted Search Runs, "ISLA, 2012, pp. 155-160.

Tools, Search Query Suggestions using ElasticSearch via Shingle Filter and Facets, Nov. 2012, pp. 1-12.

* cited by examiner

NON-EXCLUSIONARY SEARCH WITHIN IN-MEMORY DATABASES

CROSS-REFERENCE TO RELATED APPLICATIONS

This non-provisional patent application claims the benefit of U.S. Provisional Patent Application Ser. No. 61/910,867, entitled "Non-Exclusionary Search Within In-Memory Databases," filed Dec. 2, 2013, which is hereby incorporated in its entirety herein.

This application is related to U.S. patent application Ser. No. 14/557,794, entitled "Method for Disambiguating Features in Unstructured Text," filed Dec. 2, 2014; U.S. patent application Ser. No. 14/558,300, entitled "Event Detection Through Text Analysis Using Trained Event Template Models," filed Dec. 2, 2014; U.S. patent application Ser. No. 14/557,807, entitled "Method for Facet Searching and Search Suggestions," filed Dec. 2, 2014; U.S. patent application Ser. No. 14/558,254, entitled "Design and Implementation of Clustered In-Memory Database," filed Dec. 2, 2014; U.S. patent application Ser. No. 14/557,827, entitled "Real-Time Distributed In Memory Search Architecture," filed Dec. 2, 2014; U.S. patent application Ser. No. 14/557,951, entitled "Fault Tolerant Architecture for Distributed Computing Systems," filed Dec. 2, 2014; U.S. patent application Ser. No. 14/558,009, entitled "Dependency Manager for Databases," filed Dec. 2, 2014; U.S. patent application Ser. No. 14/558,055, entitled "Pluggable Architecture for Embedding Analytics in Clustered In-Memory Databases," filed Dec. 2, 2014; and U.S. patent application Ser. No. 14/557,900, entitled "Data record compression with progressive and/or selective decompression," filed Dec. 2, 2014; each of which are incorporated herein by reference in their entirety.

TECHNICAL FIELD

The present disclosure relates in general to in-memory databases, and more specifically to non-exclusionary searching within in-memory databases.

BACKGROUND

Accessing data may be simpler, more accurate and much faster from structured and semi-structured data than non-structured data. When performing a search using structured and semi-structured data by indicating key data fields it is possible to get very accurate results in a very short time frame, but is also possible that many records relevant to the query may be excluded from the results list. This may happen because the records may be stored in collections with different schemata or the records may have some missing or null fields that correspond to some of the fields specified in the query.

Therefore, there is a need for search methods with improved recall capabilities that allow mixing and matching records with different schemata.

SUMMARY

Described herein are systems and methods providing a search paradigm that may be implemented for data storage systems, such as an in-memory database system, to provide users the ability to specify a query algorithm and a detailed scoring and ranking algorithm, such that different algorithms may be determined according to each of the separate aspects of a search query. Nodes conducting the search query may then find each of the possible candidate records using each of the specified query algorithms (even if some fields are empty or not defined in a particular schema), and then score and rank the candidate records using the specified scoring and ranking algorithms. Conventional systems do not offer the ability to provide separate query and scoring algorithms within a single search query, such that each scoring algorithm may operate on a completely separate set of fields. Systems and methods described herein provide such approaches to reduce the burden of data preparation and enables re-use of data for purposes not originally intended when the data was loaded.

Systems and methods described herein provide for non-exclusionary searching within clustered in-memory databases. The non-exclusionary search methods may allow the execution of searches where the results may include records where fields specified in the query are not populated or defined. The disclosed methods include the application of fuzzy indexing, fuzzy matching and scoring algorithms, which enables the system to search, score and compare records with different schemata. This significantly improves the recall of relevant records.

The system architecture of an in-memory database that may support the disclosed non-exclusionary search method may include any suitable combination of modules and clusters; including one or more of a system interface, a search manager, an analytics agent, a search conductor, a partitioner, a collection, a supervisor, a dependency manager, or any suitable combination.

The system may score records against the one or more queries, where the system may score the match of one or more available fields of the records and may then determine a score for the overall match of the records. If some fields are missing, a penalty or lower score may be assigned to the records without excluding them. The system may determine whether the score is above a predefined acceptance threshold, where the threshold may be defined in the search query or may be a default value. In further embodiments, fuzzy matching algorithms may compare records temporarily stored in collections with the one or more queries being generated by the system.

In one embodiment,

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

Figure 1:
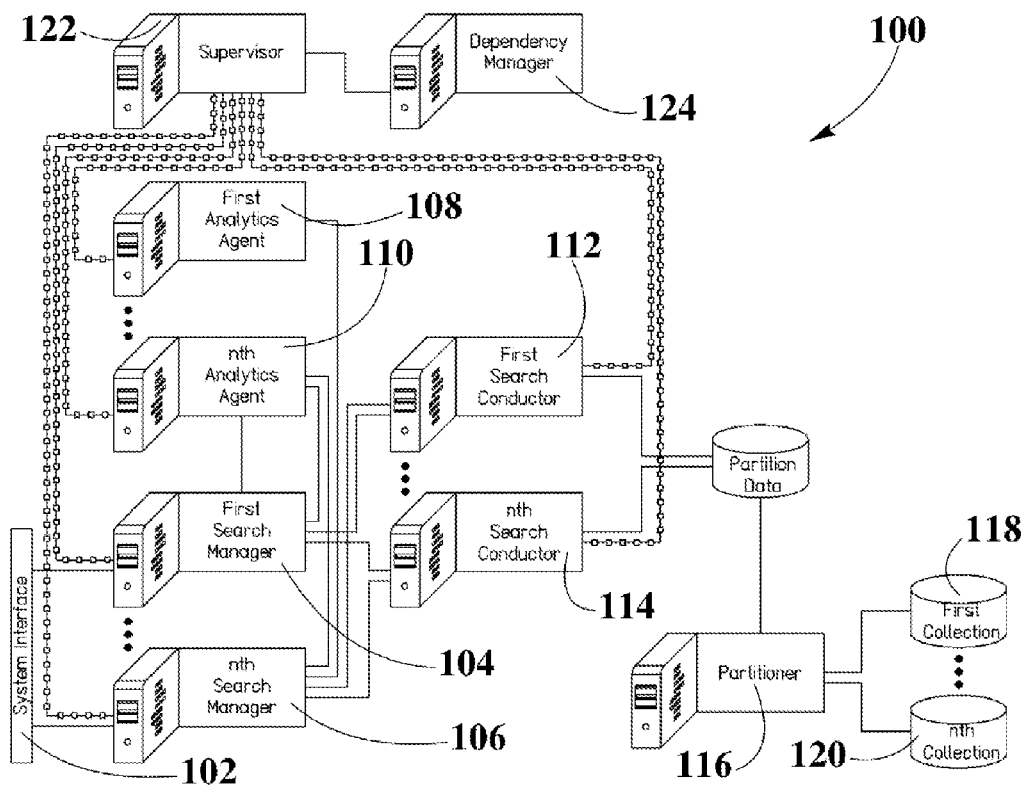
FIG. 1 shows an in-memory database architecture, according to an embodiment.

As used herein, the following terms have the following definitions:

"Database" refers to any system including any combination of clusters and modules suitable for storing one or more collections and suitable to process one or more queries.

"Query" refers to a request to retrieve information from one or more suitable databases.

"Memory" refers to any hardware component suitable for storing information and retrieving said information at a sufficiently high speed.

"Node" refers to a computer hardware configuration suitable for running one or more modules.

"Cluster" refers to a set of one or more nodes.

"Module" refers to a computer software component suitable for carrying out one or more defined tasks.

"Collection" refers to a discrete set of records.

"Record" refers to one or more pieces of information that may be handled as a unit.

"Partition" refers to an arbitrarily delimited portion of records of a collection.

"Search Manager", or "S.M.", refers to a module configured to at least receive one or more queries and return one or more search results.

"Analytics Agent", "Analytics Module", "A.A.", or "A.M.", refers to a module configured to at least receive one or more records, process said one or more records, and return the resulting one or more processed records.

"Search Conductor", or "S.C.", refers to a module configured to at least run one or more search queries on a partition and return the search results to one or more search managers.

"Node Manager", or "N.M.", refers to a module configured to at least perform one or more commands on a node and communicate with one or more headquarters.

"Supervisor" refers to a module configured to at least communicate with one or more components of a system and determine one or more statuses.

"Heartbeat", or "HB", refers to a signal communicating at least one or more statuses to one or more supervisors.

"Partitioner" refers to a module configured to at least divide one or more collections into one or more partitions.

"Dependency Manager", or "D.M.", refers to a module configured to at least include one or more dependency trees associated with one or more modules, partitions, or suitable combinations, in a system; to at least receive a request for information relating to any one or more suitable portions of said one or more dependency trees; and to at least return one or more configurations derived from said portions.

"Link on-the-fly module" refers to any linking module that performs data linkage as data is requested from the system rather than as data is added to the system.

"Schema" refers to a characteristic of a collection, partition or database which defines what fields should be in a record.

"Dictionary" refers to a centralized repository of information, which includes details about the fields in a MEMDB such as meaning, relationships to other data, origin, usage, and format.

"Field" refers to a specific data value in a record.

"Not defined" refers to a field that is not part of a particular schema.

"Not populated" refers to fields that are part of the schema, but have no assigned values.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

An in-memory database is a database storing data in records controlled by a database management system (DBMS) configured to store data records in a device's main memory, as opposed to conventional databases and DBMS modules that store data in "disk" memory. Conventional disk storage requires processors (CPUs) to execute read and write commands to a device's hard disk, thus requiring CPUs to execute instructions to locate (i.e., seek) and retrieve the memory location for the data, before performing some type of operation with the data at that memory location. In-memory database systems access data that is placed into main memory, and then addressed accordingly, thereby mitigating the number of instructions performed by the CPUs and eliminating the seek time associated with CPUs seeking data on hard disk.

In-memory databases may be implemented in a distributed computing architecture, which may be a computing system comprising one or more nodes configured to aggregate the nodes' respective resources (e.g., memory, disks, processors). As disclosed herein, embodiments of a computing system hosting an in-memory database may distribute and store data records of the database among one or more nodes. In some embodiments, these nodes are formed into "clusters" of nodes. In some embodiments, these clusters of nodes store portions, or "collections," of database information.

The present disclosure relates to methods for non-exclusionary searching within clustered in-memory databases. The disclosed non-exclusionary search methods include the execution of searches where the results may include records where fields specified in the query are not populated or defined. The disclosed methods also include the application of fuzzy matching and scoring algorithms, which enables the system to search, score and compare records from collections with different schemata.

FIG. 1 shows in-memory database 100 system architecture, according to an embodiment. MEMDB 100 system architecture may include system Interface 102, first search manager 104, nth search manager 106, first analytics agent 108, nth analytics agent 110, first search conductor 112, nth search conductor 114, partitioner 116, first collection 118, nth collection 120, supervisor 122, and dependency manager 124.

In one or more embodiments, system interface 102 may be configured to feed one or more queries generated outside of the system architecture of MEMDB 100 to one or more search managers in a first cluster including at least a first search manager 104 and up to nth search manager 106. Said one or more search managers in said first cluster may be linked to one or more analytics agents in a second cluster including at least a first analytics agent 108 and up to nth analytics agent 110.

Search managers in said first cluster may be linked to one or more search conductors in a third cluster including at least a first search conductor 112 and up to nth search conductor 114. Search conductors in said third cluster may be linked to one or more partitioners 116, where partitions corresponding to at least a First Collection 118 and up to nth Collection 120 may be stored at one or more moments in time.

One or more nodes, modules, or suitable combination thereof included in the clusters included in MEMDB 100 may be linked to one or more supervisors 122, where said one or more nodes, modules, or suitable combinations in said clusters may be configured to send at least one heartbeat to one or more supervisors 122. Supervisor 122 may be linked to one or more dependency managers 124, where said one or more dependency managers 124 may include one or more dependency trees for one or more modules, partitions, or suitable combinations thereof. Supervisor 122 may additionally be linked to one or more other supervisors 122, where additional supervisors 122 may be linked to said clusters included in the system architecture of MEMDB 100.

Figure 2:
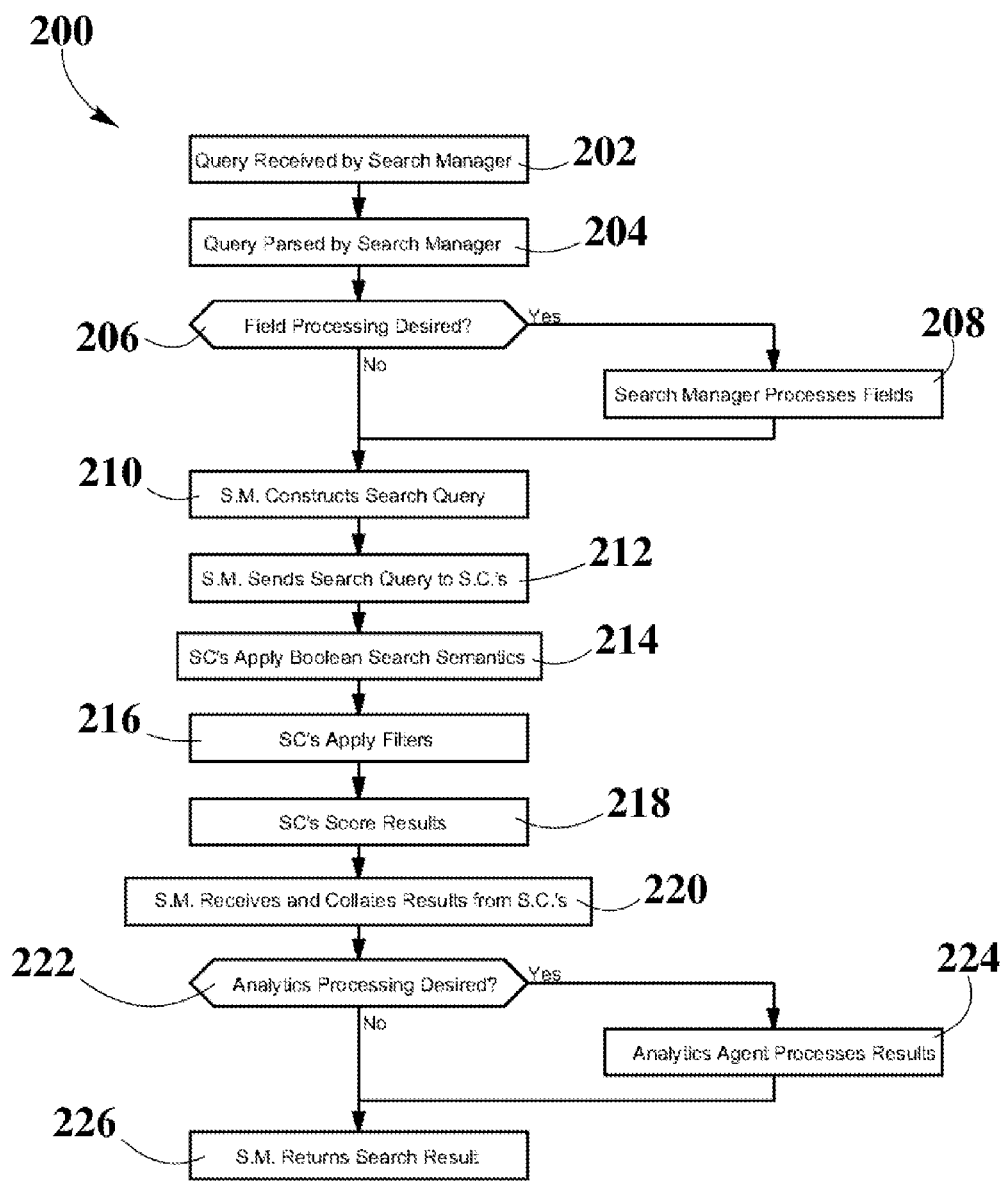
FIG. 2 is a flow chart describing a method for non-exclusionary searching, according to an embodiment.

FIG. 2 is a flow chart describing a method 200 for non-exclusionary searching, according to an embodiment. Method 200 for non-exclusionary searching may allow the system to execute searches and bring back results from records where fields specified in the query are not populated or defined in the records being searched.

The process may start with query received by search manager 202, in which one or more queries generated by an external source may be received by one or more search managers. In some embodiments, these queries may be automatically generated by a system interface 102 as a response to an interaction with a user. In one or more embodiments, the queries may be represented in a markup language, or other suitable language, including XML, JavaScript, HTML, other suitable language for representing parameters of search queries. In one or more other embodiments, the queries may be represented in a structure, including embodiments where the queries are represented in YAML or JSON. In some embodiments, a query may be represented in compact or binary format.

Afterwards, the received queries may be parsed by search managers 204. This process may allow the system to determine if field processing is desired 206. In one or more embodiments, the system may be capable of determining if the process is required using information included in the query. In one or more other embodiments, the one or more search managers may automatically determine which one or more fields may undergo a desired processing.

If the system determined that field processing for the one or more fields is desired, the one or more search managers may apply one or more suitable processing techniques to the one or more desired fields, during search manager processes fields 208. In one or more embodiments, suitable processing techniques may include address standardization, geographic proximity or boundaries, and nickname interpretation, amongst others. In some embodiments, suitable processing techniques may include the extraction of prefixes from strings and the generation of non-literal keys that may later be used to apply fuzzy matching techniques.

Then, when S.M. constructs search query 210, one or more search managers may construct one or more search conductor queries associated with the one or more queries. In one or more embodiments, the search conductor queries may be constructed so as to be processed as a stack-based search.

Subsequently, S.M. may send search conductor queries to S.C. 212. In some embodiments, one or more search managers may send the one or more search queries to one or more search conductors, where said one or more search conductors may be associated with collections specified in the one or more search queries.

Then, the one or more Search Conductors may apply any suitable Boolean search operators 214 (e.g., AND, OR, XOR) and index look-ups without excluding records based on not having specific fields present. The Search Conductor may execute the user-provided or application-provided Boolean operators and index look-ups. Thus, embodiments may execute user queries implementing fuzzy-indexes and 'OR' operators, instead of 'AND' operators, to get a candidate set of records that do not "exclude" potentially good results. Scoring features allow the best results (i.e., most relevant) to score highest, and the less-relevant records to score lower. In some cases, there are two stages to executing search queries. A search stage, in which Boolean operators, fuzzy indexes and filters may return a candidate set of results of potential results satisfying the search query. A next scoring stage may apply one or more user-specified or application-specified scoring methods to score the records in the candidate set, so the best results score high; poorer or less-relevant results below a given threshold can be excluded, so as to return only a reasonable result size. This may lead to having a very large candidate set of records that need to be scored, however in-memory database systems may be fast enough to handle sets of search results having sizes that may be too large in some cases for conventional systems. And the result is we don't miss good results just because some fields were empty or there was some noisy or erroneous data.

As mentioned, the Search Conductors may apply any suitable search filters 216 while not excluding records based on missing fields. The one or more search conductors may score 218 the resulting answer set records against the one or more queries, where the search conductors may score the match of one or more fields of the records and may then determine a score for the overall match of the records. The search conductors may be capable of scoring records against one or more queries, where the queries include fields that are omitted or not included in the records. In some embodiments, a search manager may send a query to a search conductor to be performed on a collection with a schema including less or different fields than those defined in the query. In this case the query may be reformed to modify those fields which do conform to the schema of the collection being searched to indicate they are there for scoring purpose only. In some cases, search manager can generate and/or modify the search query. That is, the Search Manger may builds a query plan that may be tailored or adjusted to account for missing fields, or fields that may not have an index defined in one or more collections.

According to some embodiments, collections with a schema different than that of the query may not be excluded, the available fields may be scored against the queries and a penalty or lower score may be assigned to records with missing fields. The fields in collections across MEMDB 100 may be normalized and each search conductor may have access to a dictionary of normalized fields to facilitate the score assignment process. Normalization may be performed through any suitable manual or automated process. If the user or application providing the search query defines fields that are normalized across multiple collections, the system may build queries that can be applied across multiple collections, even if each respective collection does not conform to the exact same schema or storage rules.

In some embodiments, fuzzy matching techniques may be applied to further broaden the lists of possible relevant results.

The system may determine whether the assigned score is above a specified acceptance threshold, where the threshold may be defined in the search query or may be a default value. In one or more embodiments, the default score thresholds may vary according to the one or more fields being scored. If the search conductor determines in that the scores are above the desired threshold, the records may be added to a results list. The search conductor may continue to score records until it determines that a record is the last in the current result set. If the search conductor determines that the last record in a partition has been processed, the search conductor may then sort the resulting results list. The search conductor may then return the results list to a search manager.

When S.M. receives and collates results from S.C.'s 220, the one or more search conductors return the one or more search results to the one or more search managers; where, in one or more embodiments, said one or more search results may be returned asynchronously. The one or more search managers may then compile results from the one or more search conductors into one or more results list.

The system may determine whether analytics processing 222 of the search results compiled by the one or more search managers is desired. In one or more embodiments, the system determines if the processing is desired using information included in the query. In one or more other embodiments, the one or more search managers may automatically determine which one or more fields may undergo a desired processing.

If the system determines that analytics processing 222 is desired, one or more analytics agents may process results 224, through the application of one or more suitable processing techniques to the one or more results list. In one or more embodiments, suitable techniques may include rolling up several records into a more complete record, performing one or more analytics on the results, and determining information about neighboring records, amongst others. In some embodiments, analytics agents may include disambiguation modules, linking modules, link on-the-fly modules, or any other suitable modules and algorithms.

After processing, according to some embodiments, the one or more analytics agents may return one or more processed results lists to the one or more search managers.

A search manager may return search results 226. In some embodiments, the one or more search managers may decompress the one or more results list and return them to the system that initiated the query. The returned results may be formatted in one of several formats, including XML, JSON, RDF or any other format.

In Example #1, the disclosed method for non-exclusionary searching is applied. A user defines a query with the following fields: FN (first name): John, LN (last name): Smith, DOB (date of birth): May 15, 1965 and PH (phone number): 555-1234-7890. The system performs the search and among the relevant results there are two records with missing fields, from two different collections with different schemata. The first one is from collection 1001, in this collection the following fields are defined FN: John, LN: Smith, PH: - - - and DOB: May 15, 1965. The second one is from collection '8021,' in this collection the following fields are defined FN: John, LN: Smith, PH: 555-1234-7890 and DOB: - - - . Since there is a good match in most fields both of the records, neither is excluded, and they get a similar final score and are positioned in the top 10 results for the query.

In Example #2, the disclosed method for non-exclusionary searching is applied. A user defines a query with the following fields: FN (first name): John, LN (last name): Smith, DOB (date of birth): May 15, 1965 and PH (phone number): 555-1234-7890. The system performs the search and among the relevant results there are two records with similar but not exactly matched fields, from two different collections with different schemata. The first one is from collection 1001, in this collection the following fields are defined FN: Jonathan, LN: Smith, PH: 1234-7890. The second one is from collection 8021, in this collection the following fields are defined FN: John, LN: Smyth, PH: 555-1234-7890 and DOB: 1965. Since there is a good match in most fields both of the records get a final score that exceeds the score threshold and are positioned in the top 10 results for the query.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A system comprising:

one or more storage nodes comprising a non-transitory machine-readable storage medium storing one or more collections of database records, wherein each respective collection stores one or more records according to a schema, and wherein the schema defines one or more fields storing a type of data in each respective record, wherein the non-transitory machine-readable storage medium comprises a main memory storing an in-memory database which contains the one or more collections of database records;

a search manager comprising a processor receiving a search query containing search parameters associated with data of one or more data types, determining whether field processing is requested in the search query, generating one or more search conductor queries based on a search query and transmitting the one or more search conductor queries to one or more search conductors nodes;

a search conductor node comprising a processor querying a collection associated with the search conductor and transmitting to the search manager a set of one or more results records containing data satisfying one or more parameters of the search conductor query in response to receiving the search conductor query from the search manager node, wherein the in-memory database contains the collection and the set of one or more results records, wherein the search manager receives a first set of search result records containing data matching at least one parameter of the search query, wherein the fields of the first set of search result records are based on a first schema, wherein the search manager receives a second set of search result records containing data matching at least one parameter of the search query, wherein the fields of the second set of search result records are based on a second schema, wherein the first schema is different from the second schema.

2. The system according to claim 1, wherein the search conductor matches each respective field of the one or more records satisfying the search parameters based on a match of the type of data in the respective field of the one or more records and the type of data of the search query.

3. The system according to claim 2, wherein the search conductor assigns a score for each respective records based on a number of matches between data in the fields of each record and the one or more search parameters.

4. The system according to claim 3, wherein the search conductor scores each respective field of the records of the collection based on the number of matches, and wherein the score assigned to each record is based on a search algorithm specified by the search conductor query.

5. The system according to claim 3, wherein the search conductor query indicates a threshold score value, and wherein the score assigned to each respective record of the set of results records satisfies the threshold score.

6. The system according to claim 3, wherein the search conductor sorts the set of results records based on the score assigned to each respective record of the collection associated with the search conductor.

7. The system according to claim 1, where the processor of the search manager executes field processing on one or more fields in accordance with the search query in response to determining that field processing is requested in the search query.

* * * * *